April 6, 1948.   C. F. HODSON   2,439,089
CONTROL OF ROTATING WING AIRCRAFT
Filed March 8, 1946    3 Sheets-Sheet 2

INVENTOR
CHARLES FRANCIS HODSON,

BY Robert B Larson
ATTORNEY

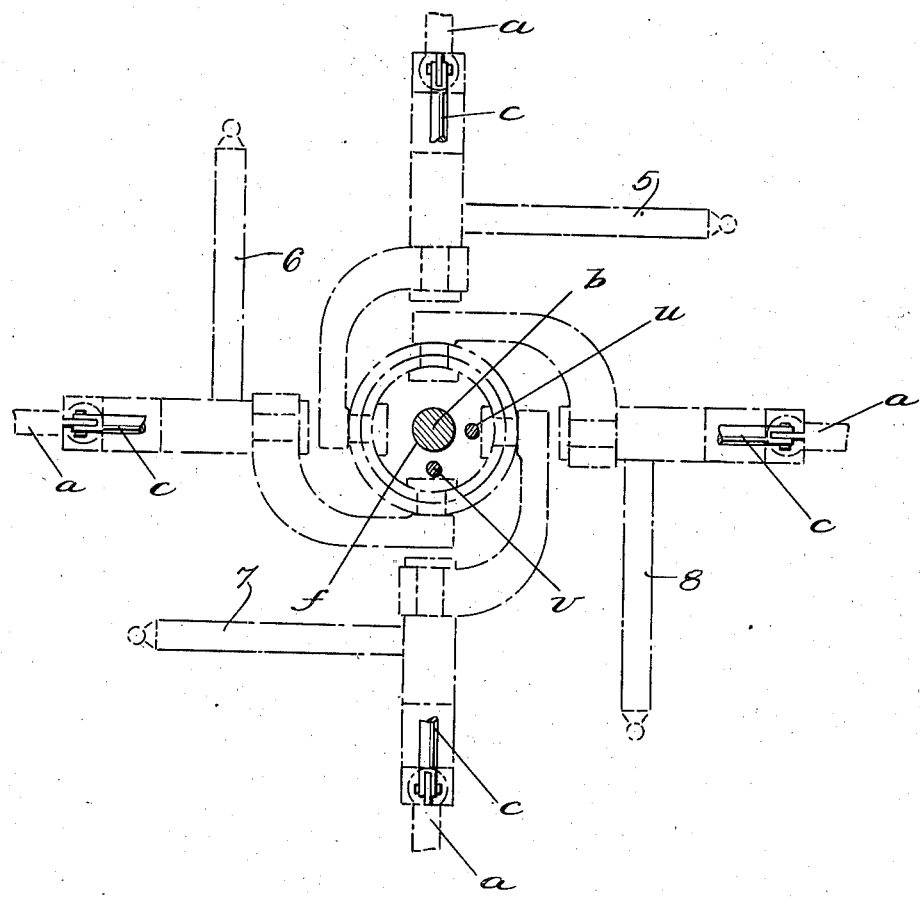

Patented Apr. 6, 1948

2,439,089

UNITED STATES PATENT OFFICE 2,439,089

CONTROL OF ROTATING WING AIRCRAFT

Charles Francis Hodson, Burnham, England, assignor to The Fairey Aviation Company, Limited, Hayes, Middlesex, England Application March 8, 1946, Serial No. 653,113
In Great Britain May 22, 1944

1 Claim. (Cl. 244—17)

This invention relates to the controlling means for the pitch changing mechanism of a rotating wing aircraft and has for its object automatically to reduce the flapping of the blades and to obtain a constant speed of rotation of the rotor.

It is known to connect such blades by supporting links with a bar which is mounted for vertical movement and also for universal movement about a point, vertical movement of said bar being arranged to bring about variation of the pitch of the rotor blades collectively and movement of said bar about said point being arranged to bring about cyclic pitch control of the rotor blades.

According to the present invention the bar is universally jointed to a vertically movable rod and also connected, by arms extending integrally therefrom in planes substantially at right angles to one another, with two further vertically movable rods, the first movable rod being operatively connected with the inching valve of a hydraulic jack for varying the pitch of the rotor blades collectively and each of the two vertically movable rods being connected with an appropriate inching valve of a hydraulic jack for effecting cyclic pitch control of the rotor blades. It is a principal object of the invention to provide such a structure.

Figure 1:
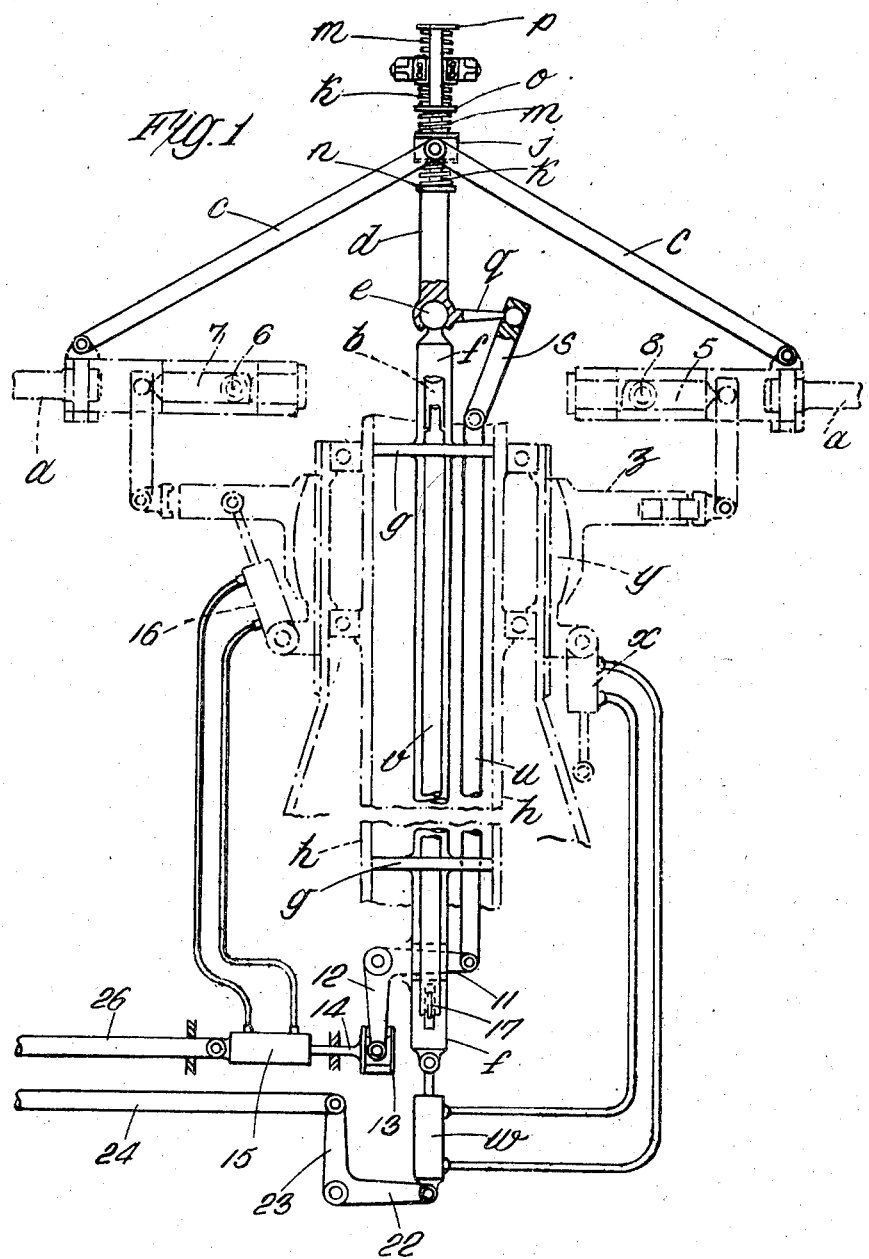
Figure 2:
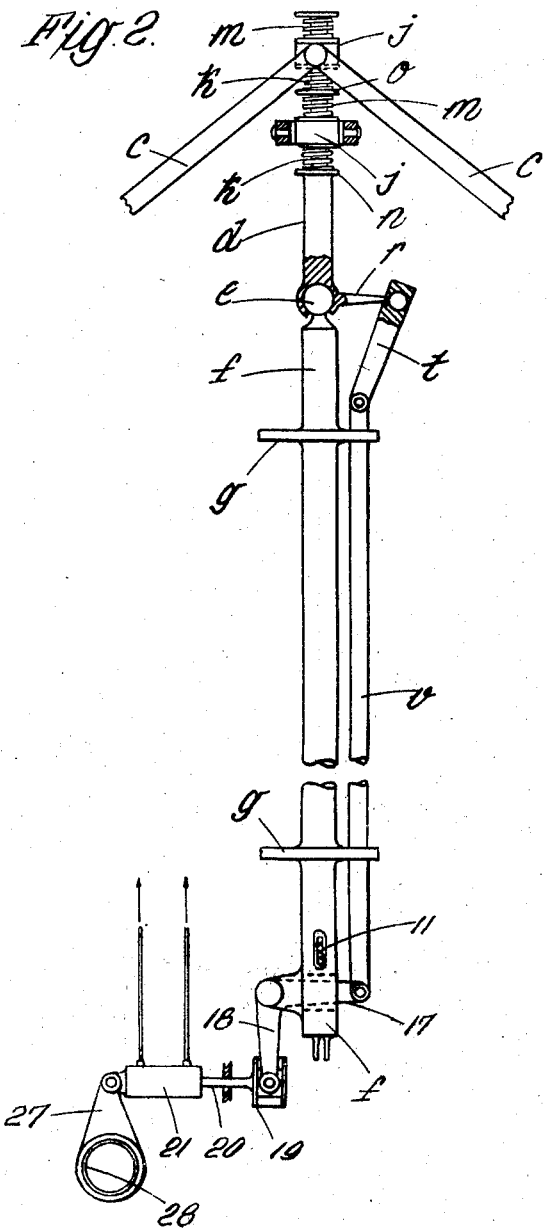

One form of the invention is illustrated by the accompanying drawings wherein Figure 1 is a quasi-diagrammatic side elevation of the improved controlling means and Figure 2 is a fragmentary elevation thereof as seen from the left, Figure 1, parts being shown in section in both views. Figure 3 is a horizontal sectional view taken on a line (not shown) passing slightly above blades $a$.

As shown, the blades, indicated at $a$ ..., of a four-bladed rotor are arranged to flap about axes passing through a common point $b$ lying on the general axis of rotation of the rotor mechanism and are connected by supporting links $c$ ... with a bar $d$ universally jointed at its lower end as at $e$ on the top of a vertically movable rod $f$ coaxially arranged on guides $gg$ slidable within the hollow shaft $h$ of the mechanism. The supporting link $c$ ... of the blades $a$ ... are not connected directly with the bar $d$ but each pair of diametrically opposite supporting links $cc$ is connected pivotally with an appropriate collar $j$ slidable on said bar $d$ between a pair of coiled springs $km$, $km$, three abutments $n$, $o$, $p$ for the springs being integral with the bar $d$, the central abutment $o$ serving in common for the lower spring $k$ of the upper pair and the upper spring $m$ of the lower pair.

Projecting radially from the bar $d$ in planes at right angles to one another, with their axes intersecting at the centre $e$ of the universal joint at the bottom of the bar $d$, are two arms $qr$ which, with the bar $d$, constitute two bell crank levers rockable in intersecting planes about the centre $e$ and at their free ends these arms $qr$ are connected by links $st$ with two further vertically movable rods $uv$ arranged eccentrically and slidably in the guides $gg$ within the hollow shaft $h$ of the mechanism.

The vertically movable rod $f$ is connected at its lower end with the inching valve $w$ of an hydraulic jack $x$ arranged to raise and lower a spherical bearing $y$ for a swash plate $z$ connected with means including arms 5, 6, 7, 8 for varying the pitch of the rotor arms $a$ ... collectively. The vertically movable rod $u$ is connected at its lower end with one arm 11 of a bell crank lever 11, 12 the other arm 12 of which projects into, and has a slidable connection with, a tubular head 13 on the plunger 14 of an inching valve 15 of an hydraulic jack 16 for varying the pitch of the rotor blades $a$ ... cyclically, the axis of the tubular head 13 being at right angles to that of the plunger 14 so that rocking of the bell crank lever 11, 12 is converted into axial movement of the plunger 14 of the inching valve 15. Similarly, the vertically movable rod $v$ is connected at its lower end with one arm 17 of a bell crank lever 17, 18 the other arm 18 of which projects into, and has a slidable connection with, a tubular head 19 on the plunger 20 of an inching valve 21 of an hydraulic jack (not shown, but lying in a radial plane at right angles to that in which is situated the jack 16) also for varying the pitch of the rotor blades $a$ ... cyclically, the axis of the tubular head 19 being at right angles to that of the plunger 20 so that rocking of the bell crank lever 17, 18 is converted into axial movement of the plunger 20 of the inching valve 21. The cylinders of all three inching valves $w$, 15 and 21 are connected, the valve $w$ by a bell crank lever 22, 23 and link 24, the valve 15 by a link 26 and the valve 21 by an arm 27 on a torque tube 28, with means (not shown) under the control of the pilot so that, apart from automatic control, to which reference will be made hereinafter, the pilot can effect pitch control of the rotor blade $a$ ... either collectively or cyclically.

The arrangement is such that when, under the action of the lift force acting on the blades $a$ ..., they tend to move upwards about the common flapping pivot point $b$, their supporting links $c$ ... compress the upper springs $m$ of each pair. If the upward flap of all the blades $a$ ... be equal the bar $d$ will rise vertically taking with it the vertically movable rod $f$ and thus operate the inching valve $w$ of the collective pitch varying jack $x$ to bring about a general reduction of the pitch of the rotor blades $a$ ... with consequent increased rotational speed and reduction of the flap angle of the blades until some static position be found.

If, however, the flap angles of the opposite blades $aa$ of a pair be not equal the bar $d$ will be tilted about the centre $e$ of the universal joint and the appropriate eccentric vertically movable rod $u$ or $v$ will be caused to actuate its inching valve 15 or 21 to bring about a cyclic change in blade pitch in such manner as to equalize the lift forces on the two blades and to cause the flap angles to become equal.

It is possible, by rotating the bar $d$, the arm $qr$ thereon their links $st$, vertically movable rods $uv$ bell cranks 11, 12 and 17, 18 and their inching valves 15 and 21 as a unit, to advance or retard the cyclic pitch change operation with regard to the sideways or forward movement of the common abutment $o$ for the supporting link springs.

If the blades $a$ ... of the rotor do not move in a path which lies on the surface of a cone the distance between the collars $jj$ to which the supporting links $c$ ... are pivoted will vary continuously and, if desired (although not shown), this variation may be used to operate through a commutator or interceptor valve the inching valve of a further hydraulic jack which in turn may operate an infinitely variable cam and tappet arrangement replacing the swashplate $z$, and giving an irregular cyclic pitch change. The phase angle of these irregularities may be advanced or retarded by rotating the cam and/or the commutator or interceptor valve about their vertical axis.

If the rotor has only three blades their supporting arms $c$ may be pivoted directly to the bar $d$ and the springs $km$ and collars $j$ eliminated.

I claim:

Controlling means for the pitch changing mechanism of a rotating wing aircraft wherein the rotor blades are connected by supporting links with a bar which is mounted for vertical movement and also for universal movement about a point, vertical movement of said bar being arranged to bring about variation of the pitch of the rotor blades collectively and movement of said bar about said point being arranged to bring about cyclic pitch control of the rotor blades, wherein the bar is universally jointed to a vertically movable rod and is also connected, by arms extending integrally therefrom in planes substantially at right angles to one another, with two further vertically movable rods, the first movable rod being operatively connected with the inching valve of an hydraulic jack for varying the pitch of the rotor blades collectively and each of the two other vertically movable rods being connected with an appropriate inching valve of an hydraulic jack for effecting cyclic pitch control of the rotor blades.

CHARLES FRANCIS HODSON.

REFERENCES CITED

The following references are of record in the file of this patent:

UNITED STATES PATENTS

| Number | Name | Date |
|---|---|---|
| 2,408,489 | Stalker | Oct. 1, 1946 |